Patented Nov. 20, 1928.

1,692,358

UNITED STATES PATENT OFFICE.

BERTHA SUGDEN, OF BOSTON, MASSACHUSETTS, ASSIGNOR, BY MESNE ASSIGNMENTS, TO TECHNICOLOR MOTION PICTURE CORPORATION, OF BOSTON, MASSACHUSETTS, A CORPORATION OF MAINE.

CLEANING GELATINOUS SURFACES AND THE LIKE.

No Drawing.  Application filed January 20, 1926. Serial No. 82,622.

The present invention relates to a method for cleaning gelatinous surfaces and the like and to a fluid composition therefor.

In the art of manufacturing colored photographic films, it is a well known procedure to effect the transfer of a coloring material such as dye from the etched portions of a master film or matrix to the blank film which is in process of preparation, by direct contact between the two surfaces and the resulting selective imbibition and adsorption of the dye by the blank. In this operation, the matrix film may be etched to correspond to the complete design to be imparted to the blank, as in the case of making monochrome films, or it may be etched to correspond to a certain single color or shade only, as in the case of polychrome printing. In either case, the etched film or matrix is wet with the dye or other coloring agent used and the excess, if any, removed. The liquid is selectively adsorbed or absorbed by the etched surfaces, and is greater or less in amount, according to the degree or extent to which any given portion has been etched. By "etching" is here meant, not necessarily dissolution or removal of a portion of the surface of the matrix film but any physical disruption or chemical alteration of the matrix surface by virtue of which its "wetting" or adsorptive property is increased beyond that of the normally "slick" or glossy surface which such films usually present.

In such operations, it is found that while some dyes are substantially completely transferred from the matrix to the blank, there are others which are not completely transferred, but leave an appreciable amount of the dye upon the matrix. This residual quantity of dye may usually be appreciably reduced by prolonging the time of contact between the matrix and the blank or by employing a more highly adsorptive blank,—which ordinarily results in effecting a substantially complete deposition on the latter of all of the superficially adsorbed dye from the matrix.

In some instances, however, there may also be a permanently adsorbed or adhering portion of the dye on the matrix. The formation of this latter, or more permanent residue is termed "croceination", and the components or characteristics of the dye which lead to this result will be called the "croceinating qualities" of the dye solution. These so-called "croceinating qualities" which are manifested by certain dye solutions, (of which the crocein dyes,—whence the name applied,—are typical) may be attributed either to an initially incomplete solution of the dye or to the subsequent segregation therefrom of certain portions of the color substance,—resulting in the dissemination through the dye of minute particles which are of a more dense consistency or concentration than the remainder and which accordingly interfere with the uniformity of its distribution over the matrix surface. On the other hand, the lack of uniformity of distribution of such dye solutions upon the matrix film may be explained by a preferential adsorption of certain constituents thereof by the matrix film substance, which is not merely physical in the nature of its association therewith, but which approaches the order of a positive chemical affinity between the two which is not subject to the ordinary mechanisms of physical separation. But whatever the true explanation or the precise mode of attachment of such irregularities in the dye deposit upon the matrix, they are incompletely transferred to the blanks printed therefrom, and tend to accumulate thereon and thus to obscure definition as well as the quality of color, in subsequent transfers to the film blanks.

The croceination effects of dye solutions just alluded to may be effectively overcome by treating with certain colloids which manifest the property of combining with the "croceinating" components, liquid or solid, followed preferably by physically coagulating the colloid added and removing the same together with the solid particles or dye constituents combined therewith, from the solution. The thus coagulated colloid carries with it, in intimate chemical or physical association, substantially all of the components which render the solution non-homogeneous and nonuniform, with respect to its distribution over the film or the matrix surfaces to which it may be applied. This procedure for decroceination, so-called, is more fully disclosed in my co-pending application Serial No. 82,621, filed January 20, 1926.

Nevertheless, when a slight croceination of the dye solution has not been recognized and overcome in this manner, or when the solution carried by the film matrix, is not completely transferred to the blank for any reason, a slight accumulation or residue of adsorbed solution is detectable upon the matrix. This residue may be but very slight in amount, as from a single impression or transfer, or it may be cumulative over a series of printing operations. In any event, it is both desirable and necessary to remove it, without disturbance or even minute alteration of the film surface, in order to permit the continued use of the matrix with satisfactory results.

Accordingly, it is an object of the present invention to provide a method for the satisfactory and complete removal of such dye solutions from the surfaces of film matrices and to provide a suitable medium for effecting this purpose.

The method of the invention includes thoroughly wetting the surface to be cleaned, as by immersion, with an excess of a solution of an inert base (typically one of the organic amines), followed by rinsing, if necessary, with fresh quantities of the liquid, and drying,—with or without recovery of the liquid as desired or practicable.

For this purpose, it is found that compounds containing an amino group such as the organic amines, which are inert with respect to the surface under treatment, are peculiarly applicable and effective in the complete disruption and removal of the dye residue. For example, di-ethyl amine is especially satisfactory. It is also further found that the more expensive amino compounds may be suitably and economically replaced by employing the radical components thereof separately. For instance, with respect to di-ethyl amine, a mixture of ethyl alcohol and ammonia is found to serve as an equivalent with substantially the same result, though much more inexpensive than the chemical compound.

Although it is to be understood that numerous other applications of the invention may be made, it will be described with reference to its specific adaptation for the removal of dyes from film matrices. For this purpose, either an amino solution is employed or an equivalent mixture of its components, such as di-ethyl amine or an ethyl alcohol solution of ammonia, respectively, which are found to be especially effective. In concentrations of 2% (95%) alcohol or less and of 2% $NH_3$ or preferably even less, the latter is substantially without action upon the gelatinous substance and inert toward both the etched and "slick" surfaces of the matrix film.

The matrix film, fouled by the accumulations of dye residues but preferably before it has been allowed to dry appreciably, is next immersed in a bath of the alcohol-ammonia solution, preferably with concurrent agitation of the solution, then removed and passed through drying ovens or the like, for rapid evaporation of the solution.

The ammonia or basic alcohol-ammonia content of the solution acts analogous to the corresponding di-ethyl amine and probably first serves to neutralize the acid or acids, which are commonly added to dye solutions to prevent spreading upon the printed film and to enhance definition in the resulting impression, and then rapidly penetrates the surface of the matrix film, thereby reaching and dissolving the adsorbed or absorbed dye substance. The latter leaves the matrix completely and is rapidly disseminated throughout the ammoniacal bath. Unless carried to an extreme degree of accumulation, the thus dissolved dye manifests no tendency to return to the matrix, and hence a single bath, even without a second washing is sufficient to thoroughly clear the matrix surface, although it may be convenient and more certain to provide one or more rinsing baths of solvent.

The alcohol, by itself, also serves to promote rapid drying,—which is a convenience, on account of the length and volume occupied by the film, and tends to remain and retain the solute in solution, in case the ammonia content is reduced through evaporation. But the entire mixture is rapidly and completely evaporated and thus removed from the matrix surface, leaving the same free and clean and in substantially the same condition as it was at the outset and before being used in the printing operation.

If the matrix is badly fouled, or if a large quantity of film matrices are to be cleaned, it will be desirable to employ a greater excess of the cleaning solution in the bath and to also introduce a series of successive washing treatments instead of a single pass. In this case, the subsequent treatments will be conducted with less contaminated solutions, according to the usual countercurrent principle.

Again, if large quantities of film are under treatment, it may be desirable to recover and condense the evaporated solvents for re-use, and more especially when the solvents employed are of an expensive character or difficult to obtain.

It will be readily appreciated that various modifications and substitutions may be made in the adaptation of the invention to practical operations. Such modifications and substitutions are, however, to be considered as comprehended in the above disclosure and within the terms of the following claims.

I claim:

1. A method for cleaning gelatinous surfaces, comprising immersing the same in a dilute, volatile solution of approximately 2% of ammonia and ethyl alcohol inert with respect to the gelatinous material, followed by drying.

2. A method for cleaning gelatinous surfaces, comprising immersing the same in a dilute, volatile aqueous solution of ethyl alcohol and not more than 2% of ammonia, followed by drying.

Signed by me at Boston, Massachusetts, this 17th day of December 1925.

BERTHA SUGDEN.